United States Patent [19]

Butler

[11] Patent Number: 5,337,545
[45] Date of Patent: Aug. 16, 1994

[54] MULCH PLATE

[76] Inventor: Walt R. Butler, 18901 SW. 63rd St., Ft. Lauderdale, Fla. 33332

[21] Appl. No.: 47,802

[22] Filed: Apr. 15, 1993

[51] Int. Cl.$^5$ ............................................. A01D 34/00
[52] U.S. Cl. .................................................. 56/320.2
[58] Field of Search ...................... 56/320, 320.1, 320.2

[56] References Cited

U.S. PATENT DOCUMENTS

| | | | |
|---|---|---|---|
| 3,646,739 | 3/1972 | Dahl | 56/320.1 |
| 3,750,378 | 8/1973 | Thorud et al. | 56/10.5 |
| 3,884,020 | 5/1975 | Dahl et al. | 56/320.2 |
| 4,041,682 | 8/1977 | Kidd | 56/320.2 |
| 4,134,249 | 1/1979 | Wuerker et al. | 56/255 |
| 4,189,904 | 2/1980 | Paker | 56/255 |
| 4,326,370 | 4/1982 | Thorud | 56/320.1 X |
| 4,726,178 | 2/1988 | Mallaney et al. | 56/202 |
| 4,864,808 | 9/1989 | Weber | 56/320.2 |
| 4,890,446 | 1/1990 | Israel | 56/17.5 |
| 4,930,298 | 6/1990 | Zenner | 56/320.1 X |
| 5,003,757 | 4/1991 | Hill | 56/17.4 |
| 5,048,279 | 9/1991 | Badawey et al. | 56/320.2 |
| 5,090,183 | 2/1992 | Thorud et al. | 56/2 |
| 5,117,616 | 6/1992 | McLean | 86/17.5 |
| 5,123,235 | 6/1992 | Fassauer | 56/12.9 |
| 5,179,823 | 1/1993 | Pace | 56/16.9 |

OTHER PUBLICATIONS

Turf South, Sep. 1992-p. 39-"Dixie Choper".
Lawn & Landscape Maintenance, Dec. 1992-pp. 66 & 67-John Deere advertisement.
Pro, Nov./Dec. 1992-p. 4-"Mulching Technology. Is it ready for commercial applications?".
Lawn & Landscape Maintenance, Dec. 1992-p. 29, "Forgotten Costs".
Yard & Garden, Jul. 1992-p. 58-"Rotary Mulching Blade Kit".
Yard & Garden, Jul. 1992-p. 20, "Steiner Mulching Mower".
Yard & Garden, Jul. 1992-p. 22, "Lawn-Boy Power Mulch Kit".
Southern Turf Management, Jan. 1993-p. 39, "Mulching".
Yard & Garden, Sep. 1992-p. 34, "Eaglestar Mulcher Convertible Mower".
Pro, Sep./Oct. 1992-p. 30, "Super Nenja 2×2 Split Level Mulching Blade".
Yard & Garden, Jul. 1992, p. 63, "Mulching Blade Kits".
Yard & Garden, Jul. 1992-pp. 7 & 8, the Ariens advertisement, White Mulching Series, Husqvarna Mulching Mower, Ariens Swivel System.
Yark & Garden, Jul. 1992-p. 81, "Houder Harmoney Mulching Mower".
Yard & Garden, Oct. 1992-pp. 15 & 16, Kubota Mulching "Husqvarna Mulching Mower".

*Primary Examiner*—Thuy M. Bui
*Attorney, Agent, or Firm*—Malin, Haley, DiMaggio & Crosby

[57] ABSTRACT

A mulch plate for mounting over the chute outlet of existing mowers to contain mower clippings so that said clippings may be drawn back under the mower for recutting by the circulation of air induced by covering the mower chute with the mulch plate.

11 Claims, 5 Drawing Sheets

MULCH PLATE

BACKGROUND OF THE INVENTION

1. Field of the Invention

This invention relates generally to a mulching arrangement, and, in particular, to a mulch plate attachment for lawn mowers which recirculates grass clippings under the lawn mower until fine particles of mulch are deposited onto the lawn.

2. Description of the Prior Art

Mulching is a process for maintaining an even soil temperature, controlling weeds, and enriching soil, whereby a mixture of organic material, such as straw, peat moss, or leaves are spread over a landscape. When grass clippings from a lawnmower are sufficiently reduced in size to small particles, they may serve as a mulching agent. Conventional mowers, however, are incapable of refining grass clippings to that desired state. The typical lawnmower propels a rotary blade to cut grass into clippings and either deposits those clippings onto the lawn or directs them into a catcher. Clippings discarded on lawn take weeks to decompose and can smother the soil rather than fertilize it, unless raked and removed. Catchers are undesirable in that mowing must be frequently interrupted to empty the contents. In either event, time is lost which could be spent cutting additional grass.

Alternatively, mulching lawnmowers can reduce expenses, increase crew efficiency, and decrease waste. Mulching lawnmowers are designed to cut grass clippings into tiny particles that decompose quickly once returned to the lawn, providing nourishment and moisture to the underlying soil. In theory, mowing time can be cut, fertilizer, trash bag, and water expenses can be reduced, and productivity can be enhanced. Unfortunately, mulching lawnmowers used today are only useful under special conditions and require constant maintenance. For example, mulching mowers normally require short, dry grass, flat landscapes, and frequently honed blades. These mowers also leave uncut strips that necessitate recutting, especially on lawns having a high moisture content, tall grass, or hills. In addition, moist grass that is cut has a tendency to stick to the underside of the conventional mulching mower, reducing the mulching capability and eventually dropping clumps of grass on the lawn.

A variety of mulching mowers are available in the prior art which have either realized the foregoing shortcomings or have been too complex to operate reliably. For example, U.S. Pat. No. 5,117,616 issued to McLane introduces a mulching lawnmower that deposits clippings in front of the mower for recirculation. The McLane mower comprises a deck which covers a rotating blade and a curved deflector which lies adjacent an opening provided in the deck between the front wheels. The deflector redirects air and grass exiting the opening downward in front of the mower. The positioning of the opening and deflector at the front of the deck allows the mower to run over grass clippings a second time, but if the grass is too wet, the opening clogs and suction under the deck becomes insufficient to lift the wet clippings off the lawn and into the cutting area. An air-floated mulch recycle system, issued to Fassauer in U.S. Pat. No. 5,123,235, employs an air-floated housing having a rotatable cutting blade, an open bottom, an air intake opening conduit and a rear discharge port. A mulch recycling system comprised of a conduit attaches to the discharge port to receive grass clippings produced by the mower for delivery to the front of the mower for recutting. An air impeller means pressurizes air to float the mower, but inhibits the mower's ability to draw grass clippings into the mulch recycling system. Moreover, dry grass is preferred for cutting, whereas wet clippings are difficult to lift into the blade, stick to the underside of the housing, and clog the tubular chute used in the mulching system. Another mulching device is found in U.S. Pat. No. 5,048,279 issued to Badawey, and is utilized as a leaf mulcher for use with a rotary blade lawnmower. The leaf mulcher comprises a rotary blade lawnmower, a grass outlet and a screen mounted on the mower over the outlet. The screen provides a cutting edge for leaves dispersed from the outlet of the mower but does not facilitate the mulching of grass clippings, is easily clogged, and is ineffective on damp lawns.

While the aforementioned devices disclose various designs for mulching debris emitted from a rotary lawnmower, no such device teaches the benefits of a low profile design that is adaptable to most mowers and capable of reducing clippings of various types, and under diversified conditions, to a mulch for discarding as a nutrient into lawns. Therefore, there exists a need for a mulching lawnmower that is able to reduce clippings from tall and wet lawns into fine particles for depositing back into the lawns as a fertilizing nutrient. This invention is intended to address and solve these problems which are not adequately resolved by the prior inventions.

SUMMARY OF THE INVENTION

The present invention includes a mulching arrangement comprised of a mulch cover or plate which adaptably attaches to the chute of conventional lawnmowers to facilitate the refinement of grass clippings into tiny particles for dispersal into lawns as a fertilizing agent. The typical lawnmower employed is comprised generally of a housing having a deck with an integrally formed peripheral skirt, a chute outlet located on the side of the mower protruding from the skirt, a motor supported by the housing, and rotatable blades that depend from the underside of the deck. The rotating blades are preferably high-lift blades that curve at their ends to enhance the creation of a high pressure above the cutting blades to lift grass blades for cutting.

In the preferred embodiment, the outlet of a mower chute is shielded by a mulch cover. The mulch cover is comprised of a front plate formed with an upper support flange, a lower lip, and partial end walls, all of which protrude inwardly toward the mower. The upper support flange provides upstanding support brackets that pivotally connect to the lawnmower chute, allowing the mulch cover to be lifted for inspection of the blade area or for cutting in confined spaces. The upper flange of the mulch cover is angled to facilitate strategic attachment to the deck of the mower in a position that creates vents for exhausting air out of the entrained volume defined by the mulch cover beyond the chute so as to allow for the sustaining of pressure gradients in said volume conducive to the recirculation of clippings and other mulchable material. The lower lip of the mulch cover prevents clippings ejected through the chute and received by the cover from prematurely dropping into the grass due to gravity before they are pulled back into the cutting area. The lower lip also completes the enclosure over the chute or outlet to create a channel for the circulation of air to control the flow of grass clippings within the housing and chamber. The end wall of the mulch cover depend from the upper flange along the front plate, leaving a space between the bottom edge of the end walls and the lower lip on each side. This space defined by the end walls provides a front opening and a rear opening for exhausting air and debris to achieve the right pressure balance inside the mulch cover entrained volume for expelling large debris to prevent clogging and for discarding clippings that have been sufficiently reduced to mulch. Clippings that are mulched to sufficiently reduced size are expelled out the front opening in the cover, while larger clippings collect at the rear opening until pulled back into the cutting area by the air flow. A hinged safety flap covers the rear opening to maintain proper air circulation and to contain clipping not yet reduced within the cover while releasing heavier debris that would otherwise clog the mulching chamber.

Unlike the prior art, the present invention forms a pressurized chamber and a unique air ventilation system on the side of the mower by shielding the outlet of the chute with the mulch cover. When the high lift mower blades are propelled, a vortex of air is created which produces a high pressure above the blades such that grass is drawn upward with the air flow into the rotating blades, ejected out the chute, and redirected by the mulch cover back into the housing for recirculation. The mulching arrangement utilizes these pressure differentials created under the deck to accelerate air flow so that grass clippings expelled by the centrifugal and air pressure forces of the rotating blades are pulled back into the cutting volume below the mower deck. During operation, a higher pressure is produced above the rotary blades than below the blades, creating a suction that lifts grass into the cutting area. The centrifugal force created by the rotating blades forces the clippings through the chute where they engage the mulch cover. The mulch cover constrains the material until the air vortex created by the blade rotation lifts and carries the clippings from the entrained volume into the low pressure cutting volume under the blade. Once the clippings are recirculated into the low pressure cutting volume, suction created from the low pressure volume post-cut volume above the blade(s) draws the clippings back through the blades. Recirculation is effectuated by an air venting system created along the mulch cover end walls such that vents are located both at the front and the rear of the cover. Without these vents, an excessive amount of pressure tends to build up under the deck, which gives rise to an increase in he pressure of the air under the deck and the entrained volume and retards the vortex, causing the system to clog. Thus, the air vents also act as pressure release channels. On the other hand, vent openings that are too large prevent the system from maintaining a proper pressure differential and air vortex.

In accordance with the present invention, it is an object thereof to provide a device for attachment to lawnmowers which causes mower clippings to recirculate under the lawnmower until fine particles of mulch are produced for dispersal into lawns as a fertilizing agent.

An additional object of the instant invention is to provide a mulching arrangement comprised of a cover that shields lawnmower chutes while providing a unique air venting system to create an air circulation pattern that recycles mower clippings under the housing.

A further object of the instant invention is to provide a mulching arrangement for use with conventional lawnmowers that reduces grass clippings into tiny particles so that raking and bagging are no longer necessitated, saving time and money.

Another object of the instant invention is to provide a mulching arrangement that pivotally connects to a lawnmower so that complete removal is not necessitated when mulching is not required or desired.

A further object of the instant invention is to provide a mulching arrangement that is simple in design and construction.

Still another object of the instant invention is to provide a mulching arrangement for use with various lawnmowers that is capable of reducing leaves and other lawn debris into fine particles of mulch.

Still another object of the instant invention is to provide a mulching arrangement that is useful and effective in wet and tall grass, and on uneven terrain.

In accordance with these and other objects which will be apparent hereinafter, the instant invention will now be described with particular reference to the accompanying drawings.

DESCRIPTION OF THE PREFERRED EMBODIMENTS

Figure 1:
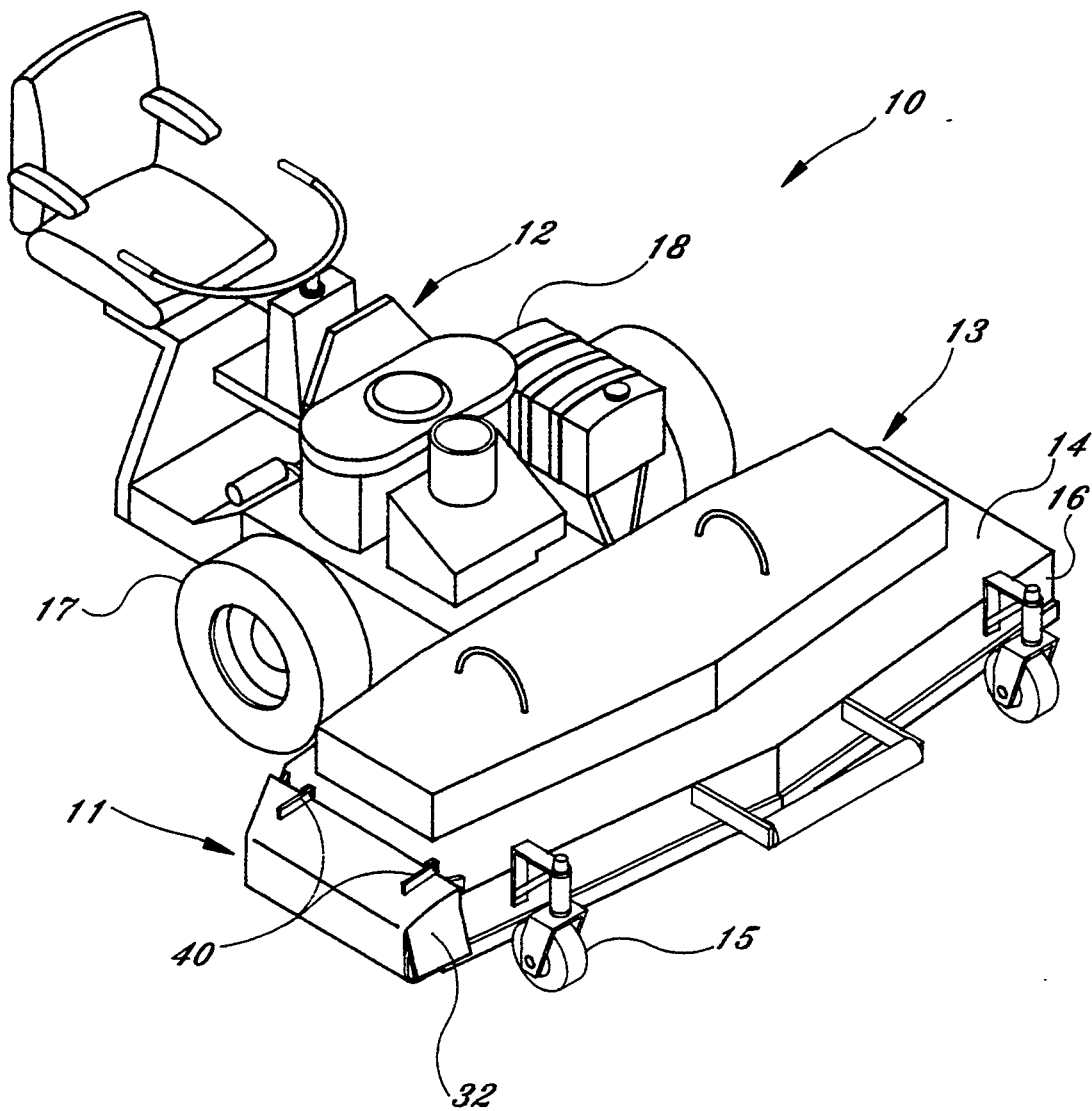
FIG. 1 is a perspective view of the instant invention.
Figure 2:
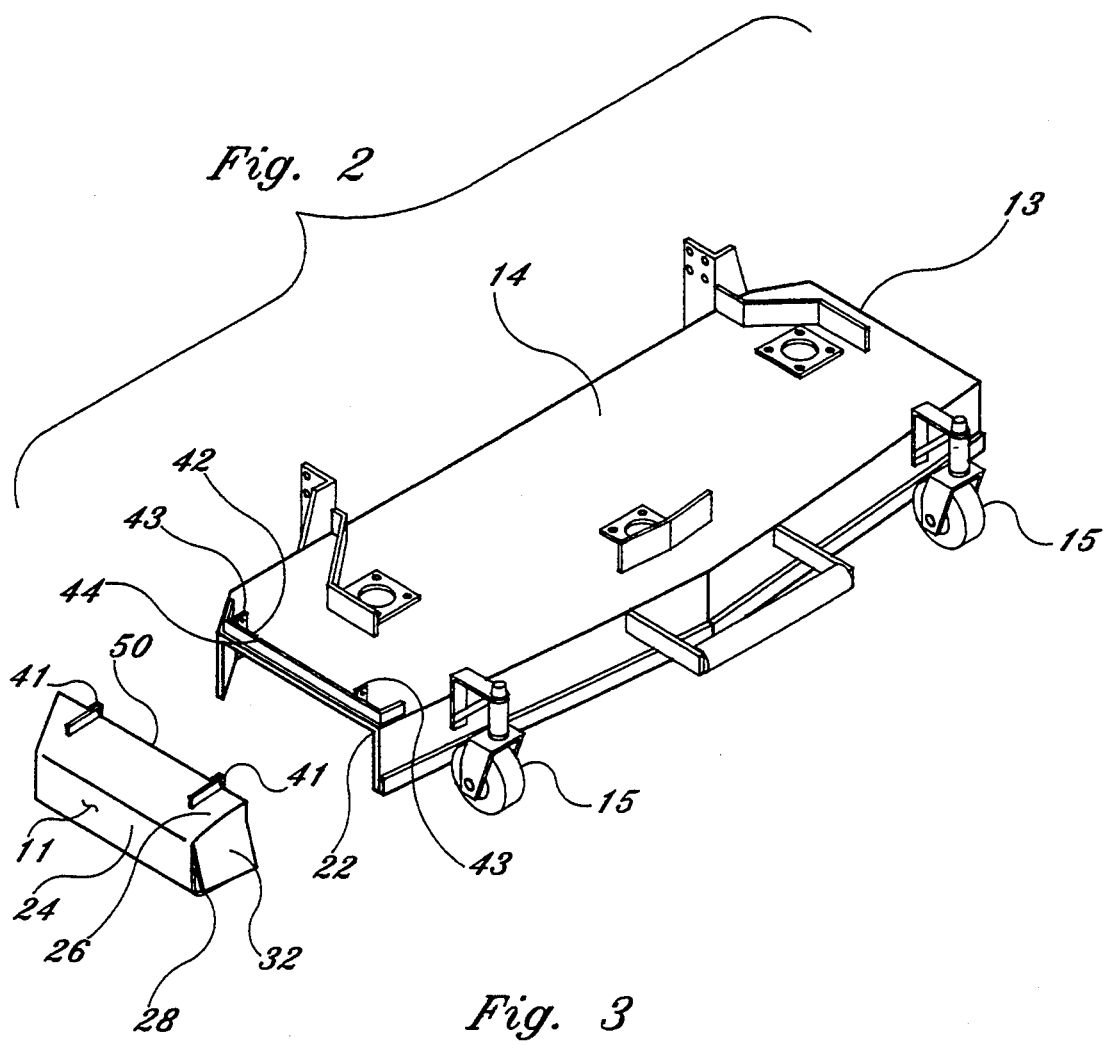
FIG. 2 is an exploded view of the mulch plate and the lawnmower housing.
Figure 3:
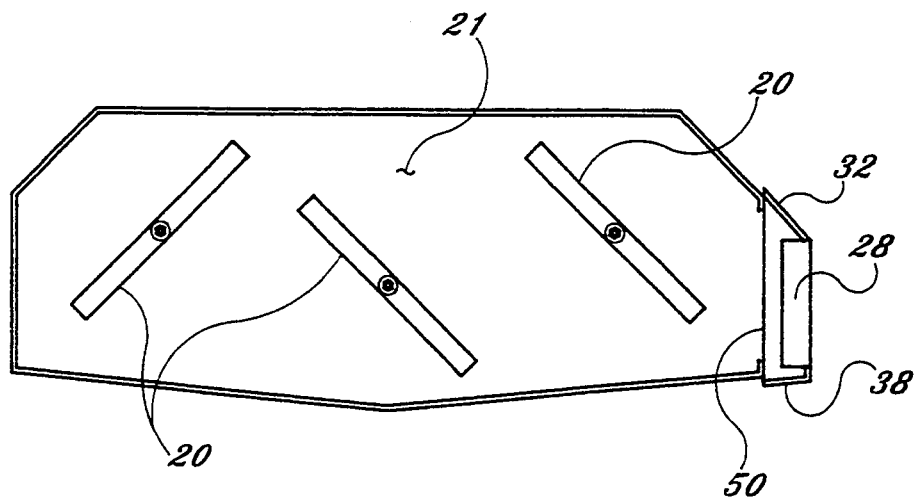
FIG. 3 is a bottom view of the lawnmower housing illustrating the rotatable blades.
Figure 4:
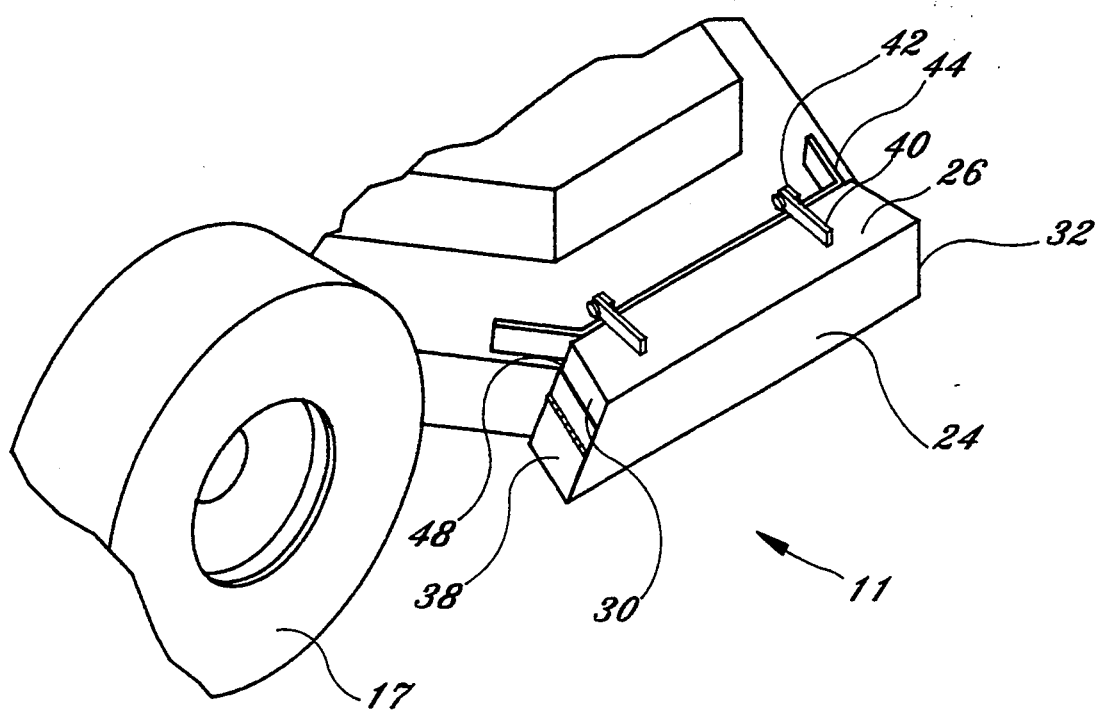
FIG. 4 is a detailed view of the mulch plate attached to a mower chute showing the hinged flap in a normally closed position.
Figure 5:
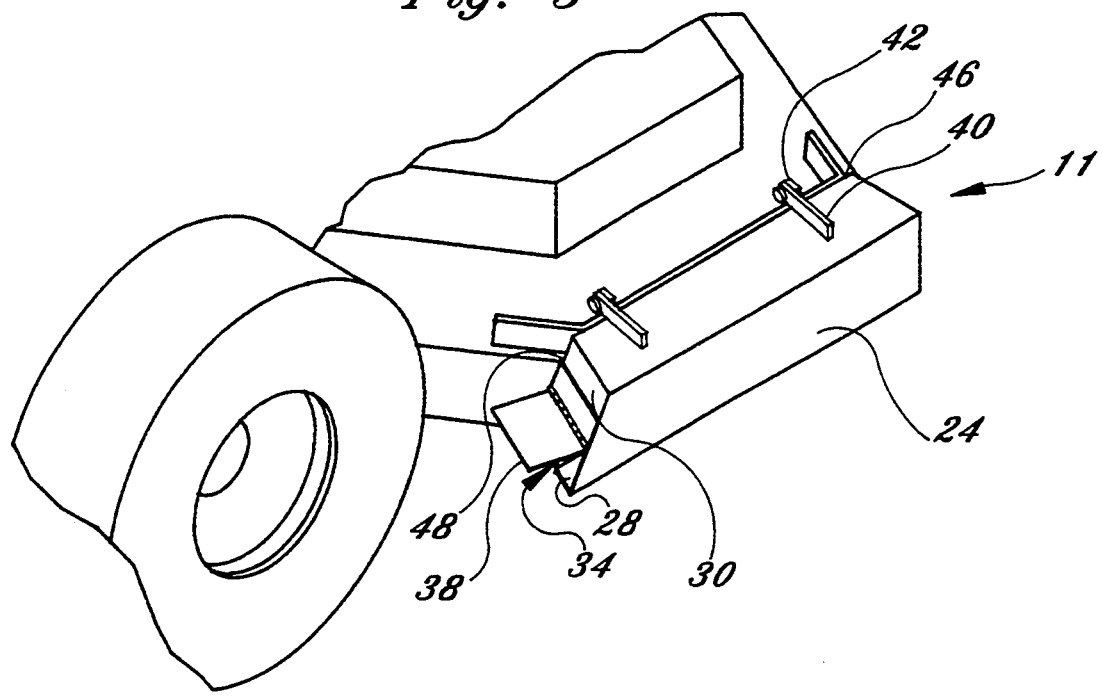
FIG. 5 is a detailed view of the mulch plate attached to the mower chute showing the hinged flap open.
Figure 6:
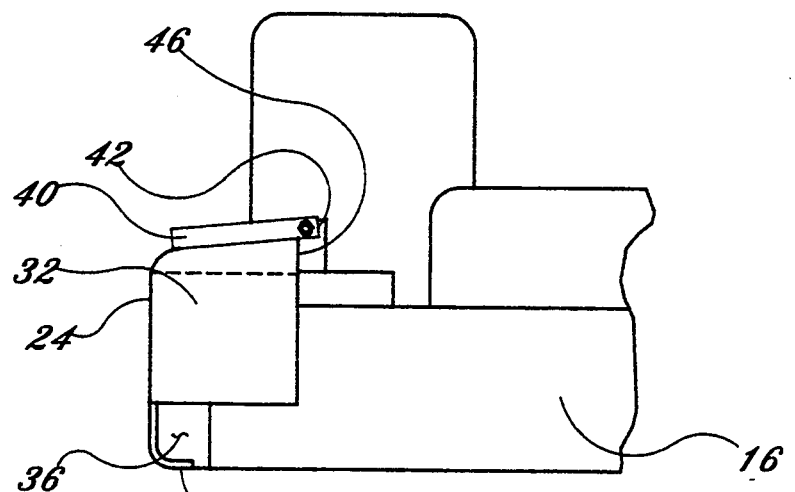
FIG. 6 is a front end view of the mulch plate attached to the mower chute.
Figure 7:
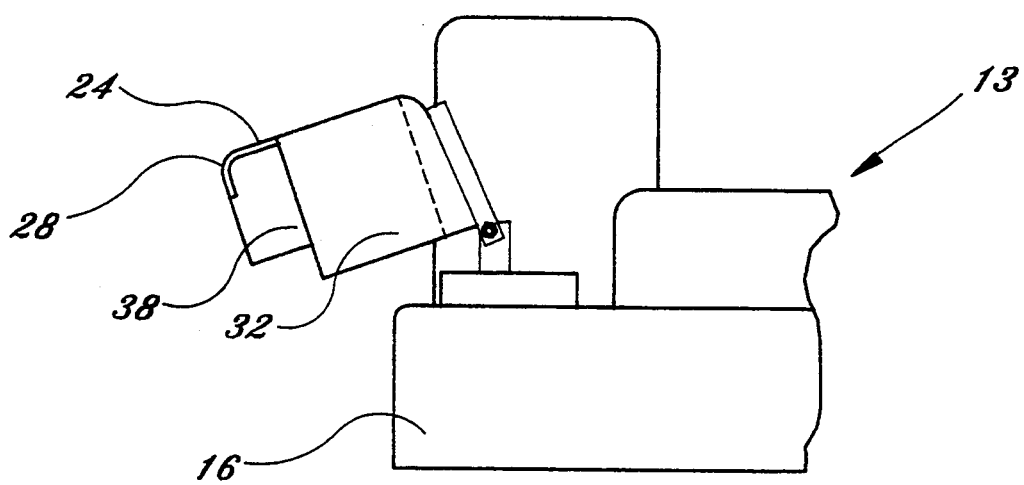
FIG. 7 is a front end view of the mulch plate lifted above the mower chute.

With reference to the drawings, FIGS. 1-9 depict a mulching arrangement generally characterized by the reference numeral 10, comprising a mulch cover 11 and a conventional lawnmower 12. The lawnmower 12 is comprised of a housing 13 having a deck 14 integrally combined with a depending skirt 16 around its peripheral edge, a motor 18 attached to the upper side of deck 14, a plurality of rotatable blades 20 suspended from the underside of the deck 14 and a discharge chute or outlet 22 defined by a portion of the skirt 16 in the side of the housing 13. The lawnmower is supported by front wheels 15 and rear wheels 17 which allow the lawnmower to be transported easily over the ground. The rotatable blades 20 which depend from the deck 14 are typically aerodynamic or high-lift in design, such that when driven by the motor 18, grass is lifted for cutting and simultaneously propelled outward towards the chute outlet 22. Grass clippings, along with other shredded debris, is prevented from immediately leaving the chute 22 by the mulch cover 11, which is attached to the deck 14 adjacent the chute 22.

The essence of the present invention is found in the mulch cover 11 as it provides a means for blocking the expulsion of mower clippings such that the clippings are recycled back into the cutting volume 21. The mulch cover 11 is comprised of an end wall plate 24 formed with an upper support flange 26, a lower lip 28, a rear end wall 30, and a front end wall 32, all of which project inwardly, toward the mower, to enclose the chute 22. The mulch cover 11 attaches to the deck 14 between front wheel 15 and rear wheel 17, wherein the end wall 24 is disposed in a generally vertical plane positioned normal to the path of exiting clippings to block and contain same. The upper support flange 26 forms an obtuse angle with end wall plate 24 along its upper edge. The rear end wall 30 and the front end wall 32 depend downwardly from opposite sides of the upper support flange 26 and, preferably but not by limitation, normal to the end wall 24 to provide partial side enclosure walls. Moreover, the vertical heights of the rear end wall and the front end wall are preferably less than that of the end wall 24. A lower lip 28 protrudes inwardly from end wall 24. The lower lip 28 in the preferred embodiment forms a right angle with the end wall 24, but may be otherwise and still fall within the scope of the instant invention. A front opening 36 is defined by the area between the bottom edge of front end wall 32 and lower lip 28, while a rear opening is defined by the area between rear end wall 30 and lower lip 28. A hinged flap 38 may be attached to the lower edge of rear end wall 30 to cover the rear opening 30.

The attachment of mulch cover 11 to the housing 13 is facilitated by support brackets 40 which protrude from the upper surface of upper support flange 26. The support brackets 40 pivotally mate with corresponding members that protrude vertically from the housing in proximity of the outlet 22. Apertures 41 and 43, found in support bracket 40 and support member 42, respectively, facilitate the connection of same. A crossbar 44 protrudes vertically from the upper side of the deck 14 along the upper edge of chute outlet 22, adjacent members 42. Upon attachment, the free edge of upper flange 26 rests on the upper edge of the crossbar 44, wherein air vents 46, 48 are formed by the gap between the end walls 30, 32 and the housing 13 and the crossbar 44. The air vents 46, 48 allow air to escape from the pressurized chamber formed by the attachment of the cover 11 over the outlet 22 through the narrow space left therebetween, as shown by the shorter arrow in FIG. 9.

The instant invention is unique in that an entrained volume 50 employing a novel pressure gradient maintenance arrangement is formed on a side of the mower by placing mulch plate 10 adjacent the chute 22. A pressure gradient and, it is believed, a vortex of air are produced under the housing and in the volume 50 when the blades are rotated, such that grass is pulled upward into the rotating blades 20 where cut and ejected toward and out of the chute 22, into the volume 50, constrained momentarily there and then sucked into the cutting volume below the blade.

Figure 8:
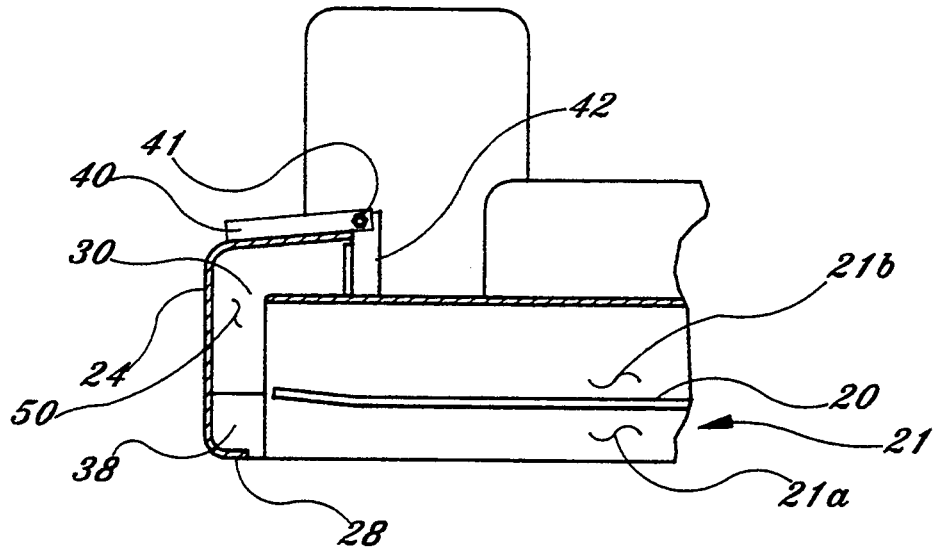
FIG. 8 is a cross sectional view of the mulch plate and lawnmower housing taken from the front end.
Figure 9:
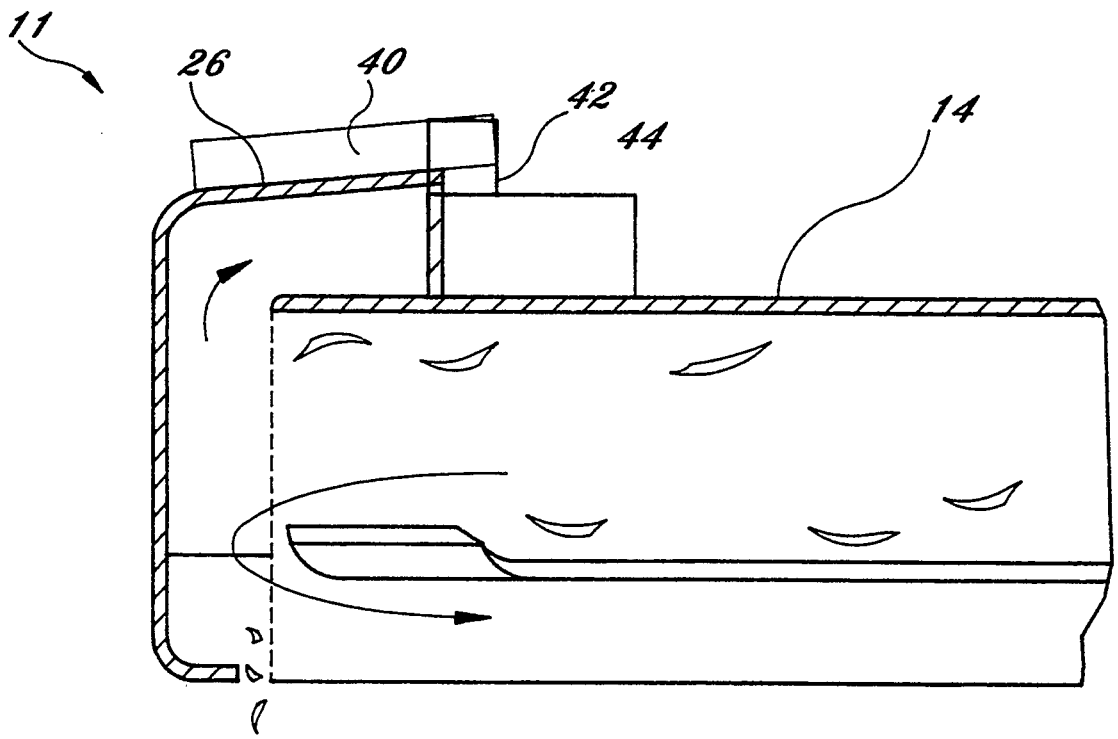
FIG. 9 is a cross sectional front view of the mulch plate in operation.

Referring to FIGS. 8 and 9, the rotation of the high-lift blades 20 creates a higher pressure above the blades than below the blades, such that grass is lifted upward into the cutting edge and clippings are ejected outward by the centrifugal force of the blades through the chute 22 into the volume 50. When viewed from the front of the lawnmower, the air vortex circulates in a clockwise direction, such that air is drawn upwards over the blades out into the entrained volume 50 and back under the blades into the low pressure volume 21a, as shown by the longer arrow in FIG. 9. By placing a mulch cover 11 over the outlet chute 22, pressure differentials are utilized to create an air vortex that circulates from under the housing into the volume 50 and back into the cutting volume. The mulching arrangement utilizes the pressure differentials created under the deck to accelerate air so that grass clippings expelled by the centrifugal force of the rotating blades get pulled back into the cutting volume. Grass clippings are accelerated out of the cutting volume 21 and into the volume 50 by the centrifugal force of the blades. Through experimentation, it has been observed that the clippings expelled from the post-cut volume 21b collect generally toward the front of the mulch cover 11 near the front end wall 32, while clippings already sufficiently reduced are accelerated out the volume 50. Larger clippings are pulled back into the cutting volume 21 by the air flow. Mulch cover 11 constrains the material at its rear 36 long enough for the air vortex created by the blade rotation to lift and carry the clippings from the volume 50 back into the cutting volume 21. Clippings recirculated into the low pressure volume 21a are drawn to the cutting edge of the blades 20 via the suction created from the high pressure volume 21b above the blades. The lower lip 28, while providing the lower portion of mulch crover 11, prevents heavier clippings ejected from the cutting area 21 from prematurely dropping to the ground before being recirculated into the blades by the air vortex. The front opening 36 allows clippings that have been sufficiently refined to escape through that opening. Large debris, such as rocks or twigs, exit the housing 13 with enough force such that they displace hinged flap 38 and escape. Flap 38 may be positioned over the rear opening in a normally closed position such as that shown in the drawings. The air vents 46 and 48 act as pressure release orifii to maintain the proper pressure gradient in the volume 50 and cutting volume. Of course, the vent openings must be designed so that they are not too large. Otherwise, the vortical circulation of air would not occur and the pressure gradient would not be established. The rotation of the blades 20 is counter-clockwise when viewed from the bottom so that the centrifugal force is directed toward the chute 22.

It should be noted that the present invention is useful for dry lawns as well as wet ones, where the unique air ventilation system causes wet clippings to be instantaneously dried, such that they do not stick to the underside of the housing 13 and circulate properly through the system along with the other clippings. It should be further noted that this system is also capable of mulching leaves and small twigs that are commonly picked up by the lawnmower. The mulch cover also blocks larger matter discharged from the mower such that injuries are prevented. Thus, the housing together with the chute outlet 22 protects the user and others in the vicinity of the mower. The air venting system facilitated by air vents 46, 48 meters the amount of air that circulates under the housing and in the volume 50. Too large an opening in the air vents 46, 48 prevents the clippings from being recirculated. Meanwhile, too small an opening in the air vents 46, 48 compresses the air and dampens the air vortex.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A mulch plate for use with a rotary lawnmower having rotating blades for cutting and a chute outlet for the expulsion of mower clippings, said mulch plate comprising:

a plate oriented over said chute outlet for preventing mower clippings from exiting said chute outlet;

means for partially enclosing said chute outlet, said means for partially enclosing projecting inward from said plate toward said mower for inducing an air vortex and for preventing mower clippings from escaping the plate and the mower;

means for pivotally mounting said mulch plate to said mower so as to allow mulch plate to be oriented over said chute outlet for mulching or for lifting said mulch plate away from said chute outlet for moving in confined spaces; and means for controlling air circulation under the mower defined by said means for partially enclosing so that clippings prevented from escaping the plate are drawn back into the rotating blades for recutting by said air circulation.

2. A mulch plate according to claim 1, wherein said mulch plate further includes a means for releasing large debris to prevent clogging.

3. A mulch plate according to claim 2, wherein said means for releasing comprises:

end walls projecting inwardly from said plate, said end walls having portions defining an opening; and a resilient flap connected to said end wall so that said flap is oriented over said opening such that said flap is displaced when engaged with sufficient force from said debris exiting said mower.

4. A mulch plate according to claim 1, wherein said means for partially enclosing said chute outlet comprises:

a flange which projects inwardly from said upper edge of said plate towards said mower;

a lip which projects inwardly from said lower edge of said plate towards said mower;

a rear end wall which depends downwardly from said flange along said rear end of said plate; and a front end wall which depends downwardly from said flange along said front end of said plate.

5. A mulch plate according to claim 1, wherein said means for pivotally mounting said mulch plate to said mower comprises a plurality of brackets protruding from said mulch plate, said plurality of brackets having apertures for mating with corresponding brackets on said mower, such that said brackets protruding from said mulch plate are connected to said brackets on said mower by a nut and bolt configuration.

6. A mulch plate according to claim 1, wherein said means for controlling air circulation under said mower comprises:

a flange projecting from the upper edge of said plate;

a lip which projects inwardly from the lower edge of said plate toward said mower;

a rear end wall which depends downwardly from said flange along the rear end of said plate, said rear end wall having a portion defining an opening;

a front end wall which depends downwardly from said flange along the front end of said plate, said front end wall having portions defining an opening.

7. A mulch plate according to claim 1, wherein said mulch plate further includes a means for releasing large debris from said mulch plate, said means for releasing attached to said means for partially enclosing.

8. A mulch plate for use with a rotary lawnmower having rotary blades for cutting and a chute outlet for the expulsion of mower clippings, said mulch plate comprising:

a plate having an upper edge, a lower edge, a front end, and a rear end for partially enclosing said chute outlet;

a flange which projects inwardly from said upper edge of said plate towards said mower;

a lip which projects inwardly from said lower edge of said plate towards said mower;

a rear end wall which depends downwardly from said flange along said rear end of said plate;

a front end wall which depends downwardly from said flange along said front end of said plate;

means for pivotally mounting said mulch plate to said mower over said chute outlet such that said mulch plate partially encloses said chute outlet for blocking the expulsion of mower clippings;

means for maintaining pressure gradients under the mower for inducing an air flow that pulls mower clippings blocked by said mulch plate back into the rotating blades for recutting;

means for releasing large debris from said mulch plate, said means for releasing attached to said rear end wall; and means for discarding mower clippings that have been sufficiently reduced to mulch, said means for discarding defined by said front end wall.

9. A mulch plate according to claim 8, wherein said means for maintaining pressure gradients under the mower comprises said rear end wall and said front end wall having portions defining a gap between said rear end wall and said front wall and said mower for releasing excess air buildup.

10. A mulch plate according to claim 8, wherein said means for discarding mower clippings sufficiently reduced comprises said front end wall having portions defining an opening for discarding said refined clippings.

11. A mulch plate according to claim 7, wherein said means for releasing large debris comprises a resilient member attached to said rear end wall such that said resilient member releases large debris when engaged with sufficient force from discarded debris.

* * * * *